C. L. HEISLER.
PROJECTILE FUSE TESTING APPARATUS.
APPLICATION FILED JULY 18, 1916.
1,241,213.
Patented Sept. 25, 1917.
3 SHEETS—SHEET 2.
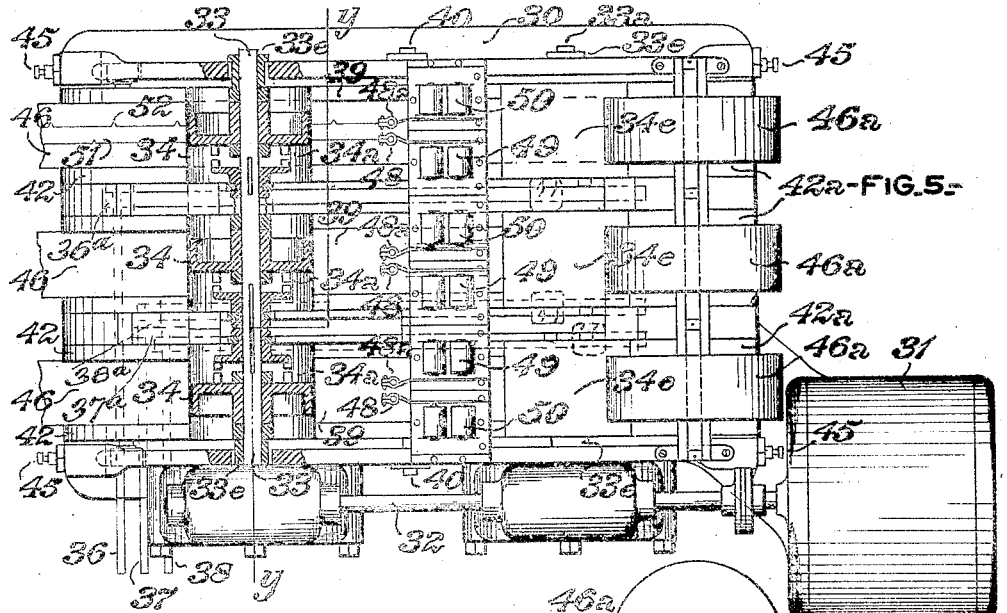
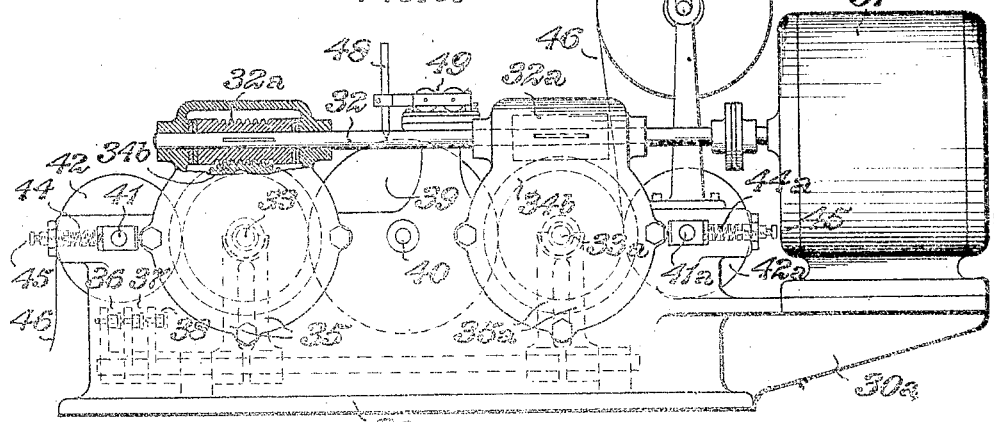
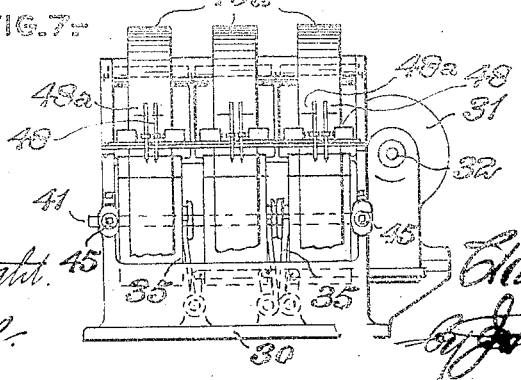
WITNESSES:
INVENTOR

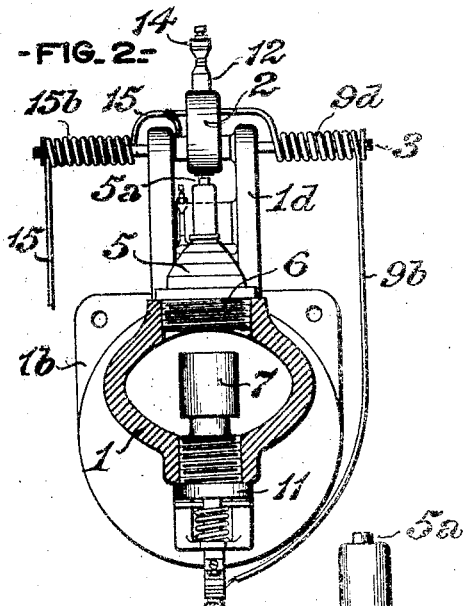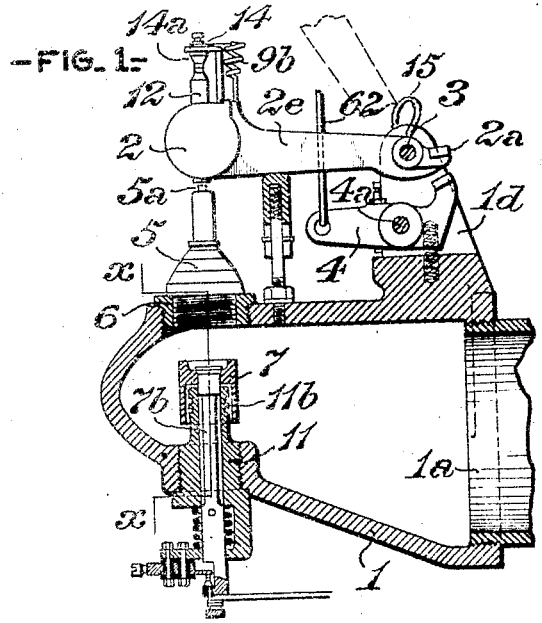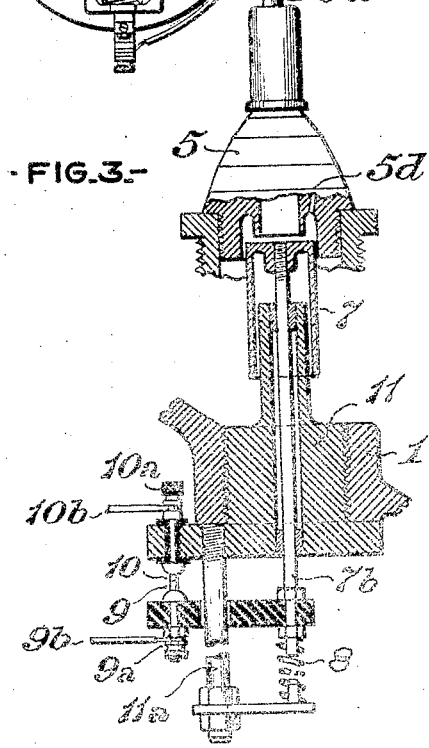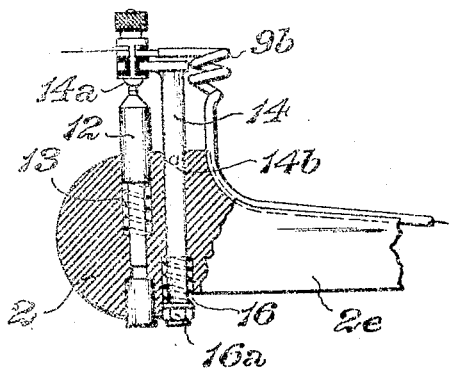

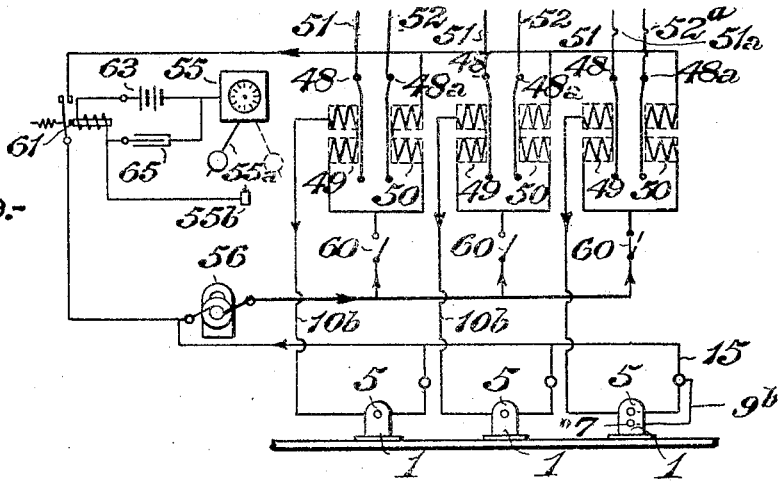
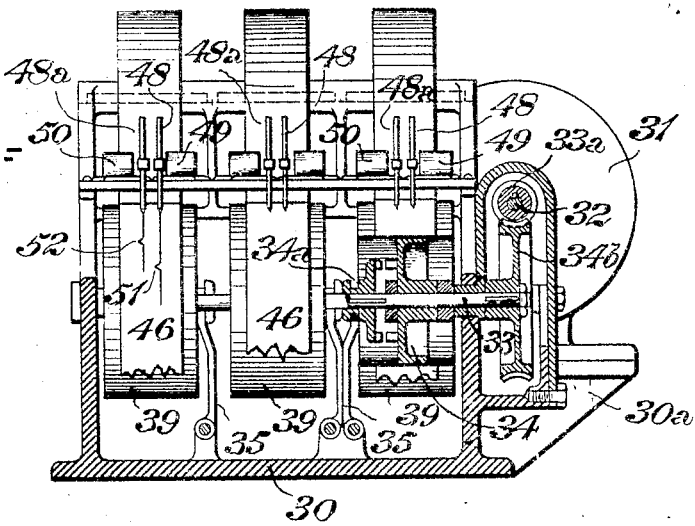

UNITED STATES PATENT OFFICE.

CHARLES L. HEISLER, OF SCHENECTADY, NEW YORK.

PROJECTILE-FUSE-TESTING APPARATUS.

1,241,213.  Specification of Letters Patent.  Patented Sept. 25, 1917.

Application filed July 18, 1916. Serial No. 109,908.

*To all whom it may concern:*

Be it known that I, CHARLES L. HEISLER, of Schenectady, in the county of Schenectady and State of New York, have invented a certain new and useful Improvement in Projectile-Fuse-Testing Apparatus, of which improvement the following is a specification.

My invention relates to means for automatically and accurately measuring and recording the time which elapses while burning a projectile fuse timing powder train, from the instant it is fired to the instant when it ignites or fires the fuse base charge.

The object of my invention is to provide simple, effective, and automatically adjustable means for firing the fuse; to avoid the necessity of adjusting related parts of the apparatus and fuse for each test; and to materially increase the accuracy and capacity of the apparatus with a minimum expenditure of highly skilled manual labor.

The improvement claimed is hereinafter fully set forth.

In the accompanying drawings: Figure 1 is a view, partly in elevation and partly in section, of improved means for supporting and firing a fuse; which forms part of a fuse testing apparatus embodying my invention; Fig. 2, a view, partly in elevation and partly in section, on the line $x$ $x$ of Fig. 1; Fig. 3, a sectional elevation, on an enlarged scale, showing structural modifications which are made when testing a fuse without a base charge; Fig. 4, a sectional elevation, on an enlarged scale, of the fuse firing hammer; Fig. 5, a plan view, partly in section, showing the recording chronometer mechanism forming part of the apparatus, which is electrically connected with the means for firing a fuse; Fig. 6, a side view, partly in section, of the same; Fig. 7, an end view, on a smaller scale; Fig. 8, a vertical section on an enlarged scale on the line $y$ $y$ of Fig. 5; and, Fig. 9, a diagrammatic plan view of the complete testing apparatus, when electrically connected.

In the practice of my invention, referring descriptively to the preferred specific embodiment which is herein exemplified, I provide a supporting member or casing, 1, having a supporting flange, $1^b$, at one end, whereby it may be fastened to a wall, bench, or other object, not shown in the drawing. A discharge outlet, $1^a$, is connected to the casing adjoining the supporting flange. An upwardly projecting bracket, $1^d$, which is formed on the casing adjacent to the flange, $1^b$, supports a small horizontally disposed shaft, 3, which is fastened in the bracket, and on which a swinging hammer, 2, is journaled. An operating latch trigger, 4, which is pivotally supported on the bracket beneath the hammer, by a pin, $4^a$, is adapted to engage with a catch, $2^a$, formed on the rear end of the arm, $2^c$, of the hammer, when placed in its upper inclined position, indicated by the broken lines. The hammer arm is in its horizontal position when striking the fuse, as illustrated by the full lines.

The projectile fuse, 5, which is to be tested, is provided with an upwardly projecting firing pin, $5^a$, of the usual construction. The fuse is supported by a bushing, 6, screwed into the upper portion of the front side of the casing, and forming a seat for the fuse. A vertically disposed reciprocating plunger, 7, is mounted directly beneath, and in vertical axial alinement with, the fuse, 5. When testing fuses which do not have a base powder charge, and are only loaded with timing powder trains, the plunger, 7, as illustrated in Fig. 3, projects upwardly into the body of the fuse, so as to form a loosely fitting piston, which is impelled downward against the resistance of a supporting coil spring, 8, by an explosive discharge from the powder train port, $5^d$. The spring, 8, is given a very low initial compression, sufficient to slightly exceed the weight of the plunger and maintain an electrical contact between the electrically insulated platinum points, 9 and 10, and is supported by a downwardly projecting rod or stem, $11^a$, secured in the plug, 11, which is fixed in the casing, 1. Binding posts, $9^a$ and $10^a$, electrically connect the corresponding contact points with a recording chronometer, through the wires, $9^b$, 15, and $10^b$, as illustrated diagrammatically in Fig. 9. Any slight explosive discharge of gas from the port, $5^d$, will cause a downward movement of the plunger, to break the electrical contact between the stationary platinum point, 10, and the movable point, 9, thereby making an instantaneous record on the chronometer, in a manner to be hereinafter described.

When the fuse is loaded with a base charge and fired, the resulting severe explosion discharges downwardly against the plunger and through the casing. To guard against its destructive effect on the apparatus, the interrupting plunger, 7, is disposed at a considerable distance below the fuse, and only a slight distance above the upwardly extending section, 11$^b$, of the plug, 11, as shown in Fig. 1. This disposition permits only a very slight movement of the plunger and contact point, before the plunger seats itself upon the plug section, 11$^b$, and closes a possible outlet for the gas between the plunger stem, 7$^b$, and the plug.

A reciprocating, vertically disposed contact breaking or circuit interrupting plunger, 12, is supported within the hammer, and inclosed thereby. A delicately adjusted coil spring, 13, (Fig. 4), is disposed within the hammer, and arranged to support the plunger and hold its upper end in contact with an electrically insulated binding post, 14$^a$, until the instant the hammer is retarded in its downward movement and the inertia of the interrupting plunger 12 breaks the contact. The post 14$^a$ is connected, by the wire, 9$^b$, to the contact point, 9. The plunger, 12, is in metallic contact with the hammer, and in electrical communication with the wire, 15, which is attached to the hammer. The wires, 9$^b$ and 15, are formed with coils, 9$^d$ and 15$^b$, that are supported upon the shaft, 3, in a manner to prevent repeatedly buckling and breaking of the wires when operating the hammer. The binding post, 14$^a$, is fixed to and electrically insulated from a rotative supporting post, 14, which is locked in contact position by a pin, 14$^b$, (Fig. 4), which engages with a notch formed in the hammer. A coil spring, 16, fastened to the lower end of the post by a nut, 16$^a$, abuts against the hammer, in such manner as to securely position the post, and to permit it to be lifted and rotated about its axis to free the contact points for cleaning, and to remove the plunger, 12, from the hammer.

The recording chronometer is mounted upon a base, 30, on which there is formed a bracket, 30$^a$, for supporting a constant speed electric motor, 31, which is coupled to a horizontal worm shaft, 32, on which are fixed two worms, 32$^a$, engaging worm wheels, 34$^b$, which actuate a pair of drum clutch shafts, 33 and 33$^a$. These shafts have one or more clutch drums, 34 and 34$^c$, loosely mounted upon them. The six clutch drums shown are of like construction, and are each provided with any well known form of clutch, 34$^a$, adapted to couple it to the shaft, 33 or 33$^a$, by means of the clutch arms, 35, 35$^a$, and the clutch rods, 36, 37 and 38 which are connected thereto by the corresponding clutch bars 36$^a$, 37$^a$, and 38$^a$, and adapted for the convenient starting or stopping of each pair of clutch drums. Three central recording drums, 39, are loosely mounted upon a central horizontal shaft, 40, and are each in contact with, and interposed between, a corresponding pair of clutch drums, 34 and 34$^c$. Each of these clutch drums is coupled to the clutch shaft by manually actuating an appropriate clutch rod 36, 37 or 38, so as to lock the corresponding clutch drum to its shaft. A laterally movable pair of shafts, 41 and 41$^a$, is disposed parallel with the shafts, 33, 33$^a$, and 40. Three outer pairs of drums, 42 and 42$^a$, are each tightly pressed against their corresponding drums, 34, and 34$^c$, by the springs, 44 and 44$^a$, so as to cause these drums to press against the central drums. The spring pressure is adjusted by the screws, 45, for the purpose of applying tension to the paper recording strips, 46, which unwind from the paper rolls, 46$^a$, and pass under the drums, 34$^c$, over the recording drums, 39, under the drums, 34, and over the drums, 42. The clutch shafts, 33, 33$^a$, have a slight lateral freedom given by the boxes, 33$^c$. The clutch drums, 34, are made slightly larger than the drums, 34$^c$, for the purpose of applying increased tension to the paper strips and to hold them tightly upon the drums, 39, while passing under the stylographic pens, 48 and 48$^a$. These pens are given a slight lateral movement in the usual manner by their corresponding relay magnets, 49 and 50, when interrupting the electric current, as indicated by the recording lines, 51, 52, and the marks, 51$^a$ and 52$^a$, as illustrated diagrammatically in Fig. 9. The event marking pen, 48, records each instant at which an electrical interruption is made by the burning of the fuse powder train, and the time marking pen, 48$^a$, records seconds of elapsed time.

The recording chronometer mechanism is wired and connected with the contact posts, 10$^a$ and 14$^a$, by the wires, 10$^b$ and 15, as illustrated diagrammatically in Fig. 9. The clock, 55, pendulum, 55$^a$, and the D. C. generator, 56, which are of ordinary construction, and, therefore, will not be herein described, are coupled to the relays, 49 and 50, in the manner shown. After closing one of the switches, 60, any electrical interruption in the circuit between the wires, 10$^b$ and 15, which takes place when testing a fuse under the hammer, 2, will cause an instantaneous lateral movement of the corresponding stylographic pen, 48, connected to the relay, 49, corresponding to the closed switch, 60, and thereby produce a record mark, 51$^a$, on the line, 51. The pendulum marks, in seconds, the corresponding measure of elapsed time by actuating the relay, 50, also corresponding to the same closed switch, and making the record marks, 52$^a$, on the line, 52, with the pen, 48$^a$, as diagrammatically indicated by the right hand set of relays and firing head, connected by the closed switch, 60.

To avoid sparking at the mercury electrical contact interrupter, 55$^b$, disposed below the pendulum, 55ª, the relay circuit breaker, 61, the condenser, 65, and the battery, 63, are interposed and connected between the electrical generator, 56, and the relay, 50, in the usual manner, as illustrated diagrammatically in Fig. 9.

In the operation of the apparatus, any one of the switches, 60, is closed; the corresponding hammer, 2, is raised to the dotted position; and a fuse is inserted as shown. The pendulum will mark, on the line, 52, by record marks, 52ª, seconds of elapsed time. The hammer is dropped by pulling on the cord, 62, (Fig. 1), which may lead from a position conveniently near the chronometer mechanism. The instant the hammer strikes and fires the fuse, the plunger, 12, interrupts the electrical circuit, and causes the corresponding pen, 48, to make a record mark, 51ª, on the line 51. During the burning of the powder train in the fuse, and up to the instant it discharges through the port, 5ᵈ, the line, 51, will be a straight line, terminating with an abrupt lateral mark, similar to the mark, 51ª, made at the instant the downward movement of the plunger, 7, breaks the contact between the platinum points, 9 and 10. The total elapsed time can be easily determined by counting, and measuring fractional seconds, on the line of record marks, 52, which, for convenience, is marked parallel with, and adjacent to, the line of record marks, 51. The hammer is again lifted to permit removal of the tested fuse, and the insertion of another. Three operators can make and record a test every half minute, and skilled operators can run two sets of tests simultaneously, if desired to further increase the capacity of the outfit. One set can be held for reserve, and comprises one of the pair of recording pens, 48; 48ª; a pair of relays, 49 and 50, a casing, 1; and hammer, 2, with their related accessories. Three such sets, with the clock and D. C. generator, comprise the complete apparatus.

Heretofore, when testing the timing trains of fuses with older devices, it was the practice to screw a fuse tightly into a holder, to vertically adjust an electric contact actuating trigger disposed adjacent to the firing pin, so that a falling bar guided by slides would strike the trigger and pin as nearly as possible at the same instant. A base trigger was also set to insure an unbroken electrical contact governed thereby. The accuracy of the timing depended upon the personal skill and ability of the operator when setting the triggers, and several minutes were required to fasten the fuse and set the triggers.

In my improved apparatus, the contact breakers are entirely automatic in their action and require no setting, and the fuse is merely set in its seat, since the action of the device shown in Fig. 3 is so sensitive that a base charge is not required, and since a very slight puff of gas from the port, 5ᵈ, will break the contact at the points, 9 and 10. My invention not only reduces the time required for making a test and record, which usually required from four to five minutes, to one-half minute, when taking the average time for eight hours' actual operation, but also effects a material saving, by eliminating the cost of loading a base powder charge, and removing the debris resulting from a very noisy explosion thereof, which frequently destroyed the triggers of the older devices. My improved apparatus rarely fails in making a perfect record, whereas the older devices, which depend largely upon the skill and care of the operators, lost a large percentage of tests from failure in making a record.

I claim as my invention and desire to secure by Letters Patent:

1. The combination, in a fuse testing apparatus, of a recording chronometer; a supporting member having a fuse seat formed thereon; a firing hammer supported above said supporting member; means for releasing the hammer and causing it to strike a fuse supported on said seat; electrical contact members supported on the hammer and adapted to be connected and establish electrical communication with the recording chronometer; and a reciprocating member carrying one of said contact members, and adapted to interrupt said electrical communication at the instant the hammer fires the fuse.

2. The combination, in a fuse testing apparatus, of a recording chronometer; a supporting member having a fuse seat formed thereon; a firing hammer supported above said supporting member; means for releasing the hammer and causing it to strike a fuse supported on said seat; electrical contact members supported on the hammer and adapted to be connected and establish electrical communication with the recording chronometer; a reciprocating member carrying one of said contact members, and adapted to interrupt said electrical communication at the instant the hammer fires the fuse; and means for interrupting electrical communication at the instant explosive gases discharge from the base of the fuse.

3. The combination, in a fuse testing apparatus, of a recording chronometer; a supporting member having a fuse seat formed thereon; a firing hammer; means for pivotally mounting the hammer on the supporting member; means for releasing the hammer and causing it to strike a fuse when disposed on said seat; electrical interrupting means disposed beneath the fuse seat; and electrical communicating means coupled with the hammer, the interrupting means, and the recording chronometer, and adapted to transmit to a record on the chronometer the instant of firing and time of burning the fuse timing powder train.

4. The combination, in a fuse testing apparatus, of a recording chronometer; a supporting member having a fuse seat formed thereon; a firing hammer; means for pivotally mounting the hammer on the supporting member; means for releasing the hammer and causing it to strike a fuse when disposed on said seat; a movable electrical contact member carried by the hammer; electrical interrupting means, comprising a vertically reciprocating interrupting plunger disposed beneath the fuse, in axial alinement therewith; and electrical communicating means connected to said contact member carried by the hammer, to the interrupting means, and to the recording chronometer, and adapted to transmit to the chronometer, the instant of firing and time of burning the fuse timing powder train, for the purpose of making a record thereof.

5. The combination, in a fuse testing apparatus, of a chronometer mechanism including a clock; a recording surface having its motion governed thereby; time and event recording markers; means for connecting the clock and the time marker so as to actuate the marker and record increments of elapsed time; a timing fuse supporting member; a movable firing hammer; means for guiding the hammer when firing a fuse; electrical means for actuating the event marker; a movable electrical current interrupter carried by the hammer, and adapted to interrupt a current at the instant the hammer is retarded when firing a fuse; and a conductor adapted to establish electrical communication between the interrupter and said means for actuating the event marker, so as to cause a movement of the marker at the instant the current is interrupted.

6. The combination, in a fuse testing apparatus, of a chronometer mechanism, including a clock; a recording surface having its motion governed thereby; time and event recording markers; means for connecting the clock and the time marker so as to record increments of elapsed time; a timing fuse supporting member; a movable firing hammer; means for guiding the hammer when firing a fuse; electrical means for actuating the event marker; a movable electrical current interrupter carried by the hammer and adapted to interrupt a current at the instant the hammer is retarded when firing a fuse; a conductor adapted to establish electrical communication between the interrupter and said means for actuating the event marker, so as to cause a movement of the marker at the instant the current is interrupted; and means for actuating the event marker at the instant the timing fuse powder train has burned its predetermined length and flashed from the base of the fuse.

7. The combination, in a fuse testing apparatus, of a chronometer mechanism, including a clock; a recording surface having its motion governed thereby; time and event recording markers; means for connecting the clock and the time marker so as to record increments of elapsed time; a timing fuse supporting member; a movable firing hammer; means for guiding the hammer when firing a fuse; electrical means for actuating the event marker; a movable electrical current interrupter carried by the hammer and adapted to interrupt a current at the instant the hammer is retarded when firing a fuse; a conductor adapted to establish electrical communication between the interrupter and said means for actuating the event marker, so as to cause a movement of the marker at the instant the current is interrupted; and means for actuating the event marker at the instant the timing fuse powder train has burned its predetermined length and flashed from the base of the fuse; comprising a movable plunger, means for guiding the plunger and positioning one end thereof near a fire flash discharge outlet, a current interrupter formed on the plunger and placed in circuit by said electrical conductor with the electrical means for actuating the event marker, and a spring for normally supporting the plunger in its position near the outlet.

8. The combination, in a fuse testing apparatus, of a chronometer mechanism, including a clock; a recording surface having its motion governed thereby; time and event recording markers; means for connecting the clock and the time marker so as to actuate the marker and record increments of elapsed time; a timing fuse supporting member; a movable firing hammer formed on an arm having a pivotal bearing at one end thereof; means for pivotally supporting the hammer when firing a fuse; electrical means for actuating the event marker; a movable electrical current interrupter, comprising a sliding plunger, carried by the hammer and adapted to interrupt a current at the instant the hammer is retarded when firing a fuse; and a conductor adapted to establish communication between the interrupter and said means for actuating the event marker, so as to cause a movement of the marker at the instant the current is interrupted.

9. The combination, in a fuse testing apparatus, of a chronometer mechanism, including a clock; a plurality of recording surfaces having their motion governed thereby; time and event recording markers; means for connecting the clock and the time markers so as to record increments of elapsed time; a plurality of timing fuse supporting members; a plurality of movable firing hammers; means for guiding each hammer when firing a fuse; electrical means for actuating the event markers; a movable electrical current interrupter carried by each hammer and adapted to interrupt a current at the instant the hammer is retarded when firing a fuse; conductors adapted to establish electrical communication between the corresponding interrupters and said means for actuating the event markers, so as to cause a movement of a corresponding marker at the instant the current is interrupted; and means for actuating the event markers at the instant the corresponding timing fuse powder train has burned its predetermined length and flashed from the base of the fuse.

10. The combination, in a fuse testing apparatus, of means for supporting a fuse; means for firing the fuse; recording event and time markers; means for actuating the time markers so as to record increments of elapsed time; means for actuating the event marker at the instant of firing the fuse and at the instant explosive gases discharge from the base thereof; a supporting base; a horizontally disposed pair of adjustable clutch drums; a pair of motor actuated clutch shafts coupled thereto; a recording drum disposed under the markers, and between the members of the pair of clutch drums, so as to be driven thereby; and means for adjusting the pressure between the drums, for the purpose of traversing recording paper under said markers.

11. The combination, in a fuse testing apparatus, of means for supporting a fuse; means for firing the fuse; recording event and time markers; means for actuating the time markers so as to record increments of elapsed time; means for actuating the event marker at the instant of firing the fuse and at the instant explosive gases discharge from the base thereof; a supporting base; a horizontally disposed pair of adjustable clutch drums; a pair of motor actuated clutch shafts coupled thereto; a recording drum disposed under the markers, and between the members of the pair of clutch drums, so as to be driven thereby; and means for adjusting the pressure between the drums, for the purpose of traversing recording paper under said markers, comprising an adjustable pair of outer drums provided with means adapted to press them against the clutch drums.

12. The combination, in a fuse testing apparatus, of means for supporting a fuse; means for firing the fuse; recording event and time markers; means for actuating the time markers so as to record increments of elapsed time; means for actuating the event marker at the instant of firing the fuse and at the instant explosive gases discharge from the base thereof; a supporting base; horizontally disposed pairs of adjustable clutch drums; a pair of motor actuated clutch shafts coupled thereto; a plurality of recording drums, one of each disposed under a corresponding event and time marker and between the corresponding pair of clutch drums, so as to be driven thereby; and means for adjusting the pressure between the drums for the purpose of traversing recording paper under the corresponding markers.

13. The combination, in a fuse testing apparatus, of means for supporting a fuse; means for firing the fuse; recording event and time markers; means for actuating the time markers so as to record increments of elapsed time; means for actuating the event marker at the instant of firing the fuse and at the instant explosive gases discharge from the base thereof; a supporting base; horizontally disposed pairs of adjustable clutch drums; a pair of motor actuated clutch shafts coupled thereto; a plurality of recording drums, one of each disposed under a corresponding event and time marker and between the corresponding pair of clutch drums, so as to be driven thereby; means for adjusting the pressure between the drums for the purpose of traversing recording paper under the corresponding markers; clutches mounted upon the clutch shaft and interposed between the drums; and means for coupling a pair of corresponding clutches, one on each shaft, for the purpose of simultaneously starting or stopping a corresponding pair of clutch drums, one on each clutch shaft, so as to stop the traverse of the corresponding recording paper.

CHARLES L. HEISLER.

Witnesses:
RALPH B. BURTON,
HADLEY E. YOUNG.